United States Patent [19]

Henning et al.

[11] Patent Number: 5,043,375

[45] Date of Patent: Aug. 27, 1991

[54] COATING COMPOSITION, A PROCESS FOR COATING PLASTIC SUBSTRATES AND THE COATED PLASTIC SUBSTRATES OBTAINED THEREFROM

[75] Inventors: Wolfgang Henning, Kürten; Kirkor Sirinyan; Bruce Benda, both of Gladbach, all of Fed. Rep. of Germany

[73] Assignees: Bayer Aktiengesellschaft, Leverkusen Bayerwerk, Fed. Rep. of Germany; Mobay Corporation, Pittsburgh, Pa.

[21] Appl. No.: 614,888

[22] Filed: Nov. 16, 1990

[30] Foreign Application Priority Data

Dec. 1, 1989 [DE]  Fed. Rep. of Germany ....... 3939760

[51] Int. Cl.$^5$ ................................................ C08K 5/06
[52] U.S. Cl. ...................................... 524/372; 524/373; 524/507
[58] Field of Search .................... 524/507, 372, 373

[56] References Cited

U.S. PATENT DOCUMENTS 2,468,480  4/1949  Bradley, Jr. ......................... 260/3.5
3,676,391  7/1972  De Ross .......................... 260/33.6 UA

FOREIGN PATENT DOCUMENTS 3909217  3/1989  Fed. Rep. of Germany .
1040539  8/1966  United Kingdom .

Primary Examiner—Paul R. Michl
Assistant Examiner—Christopher P. Rogers
Attorney, Agent, or Firm—Joseph C. Gil; Thomas W. Roy

[57]     ABSTRACT

The present invention relates to a coating composition which contains a one- or two-component binder and, in addition, a) 0.1 to 15.0% by weight, based on the weight of the binder, of at least one coupling agent based on a chemically modified, amorphous polyolefin having an average molecular weight of 10,000 to 100,000, a non-uniformity of 1.0 to 6.5, a chlorine content of 2.5 to 50% by weight and a total content of nitrogen, oxygen, sulfur and silicon, in the form of chemically incorporated functional groups, of about 2.5 to 15% by weight, and b) 2.5 to 50% by weight, based on the weight of the amorphous polyolefin, of a bisphenol derivative corresponding to the formula

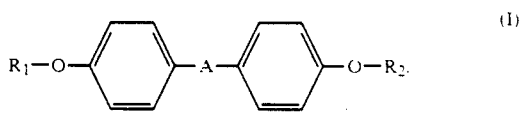

(I)

The present invention also relates to a process for coating plastic substrates with this coating composition and to the coated plastics obtained therefrom.

20 Claims, No Drawings

COATING COMPOSITION, A PROCESS FOR COATING PLASTIC SUBSTRATES AND THE COATED PLASTIC SUBSTRATES OBTAINED THEREFROM

BACKGROUND OF THE INVENTION

1. Field of the Invention

The present invention relates to a coating composition containing certain chemically modified, amorphous polyolefins, particularly polypropylenes, as coupling agents in combination with certain bisphenol derivatives as a further auxiliary, to a process for coating plastic substrates and to the coated plastic substrates obtained therefrom.

2. Description of the Prior Art

The application of firmly adhering paint coatings to plastics, particularly injection molded articles of polypropylene (PP) requires chemical or physical modification of the substrate surfaces. Flame treatment (cf. for example F. Garbassi et al, J. Mater Sci., 22, pages 207 to 212 (1987)), corona treatment (cf. for example F. Lawson, Rubber Chem. and Technol., 60, 102 (1987)), plasma treatment (cf. for example L. H. Coopes et al, J. Macromol. Chem., 17, pages 217 to 226 (1982) and EP-A-0 282 094), and pickling with chromosulfuric acid (cf. for example M. Salkauskas, J. Appl. Polym. Sci., 26, pages 2097 to 2098 (1981) are mentioned in this regard. It is also evident from the literature that plastics parts based on polypropylene and polyethylenes can be painted with firmly adhering coatings by precoating with coupling agents based on chlorinated polyolefins (U.S. Pat. No. 3,676,391) or polyolefins modified with maleic acid anhydride (DE-OS 1 546 982).

These methods are expensive and, in addition, cannot be applied to injection molded articles of complicated geometry. Apart from the high handling costs, the application of coupling agents involves environmental problems due to their low solids content. In addition, there use is limited to certain paint systems.

In the PCT Application No. WO 88/05346, it is proposed to modify the coatings of coupling agents by additional measures, such as UV irradiation, which involves additional expense.

The incorporation of chlorinated polyolefins, for example conventional chlorinated polyolefins, in the paints, as recommended in U.S. Pat. No. 2,468,480, is attended by the disadvantage that the chlorinated polyolefins show poor compatibility with the paints typically used for plastics. In addition, their solubility in typical paint solvents is very poor which adversely affects processability.

In Applicants' earlier German Patent Application P 39 09 217.8, it is recommended to use chemically modified, amorphous polyolefins - of the type also used in accordance with the present invention - as a coupling agent. However, the sole use of these compounds as coupling agents is attended by the disadvantage that these additives cannot be incorporated in the paints in sufficiently non-sedimenting form such that they soon sediment and thus lose their effectiveness.

Accordingly, an object of the present invention is to provide a new process for painting plastics which, through the use of new coupling agents, would be suitable for the production of high-quality paint coatings without being attended by the disadvantages of the prior art processes cited above. It is a further object to provide coating compositions which contain coupling agents in non-sedimenting form.

These objects may be achieved in accordance with the present invention as described in detail hereinafter by the use coupling agents in combination with certain bisphenol derivatives.

SUMMARY OF THE INVENTION

The present invention relates to a process for coating a plastic substrate by applying a coating composition which contains a one- or two-component binder and, in addition, a) 0.1 to 15.0% by weight, based on the weight of the binder, of at least one coupling agent based on a chemically modified, amorphous polyolefin having an average molecular weight of 10,000 to 100,000, a non-uniformity of 1.0 to 6.5, a chlorine content of 2.5 to 50% by weight and a total content of nitrogen, oxygen, sulfur and silicon, in the form of chemically incorporated functional groups, of about 2.5 to 15% by weight, and b) 2.5 to 50% by weight, based on the weight of the amorphous polyolefin, of a compound corresponding to the formula

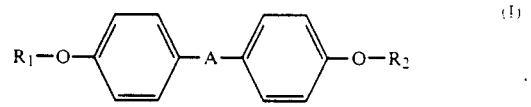

wherein

A is a difunctional radical corresponding to the following formulae

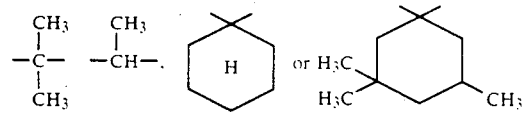

and

R$_1$ and R$_2$ may be the same or different and represent a saturated aliphatic hydrocarbon radical containing 1 to 8 carbon atoms, a hydroxyalkyl radical containing 2 to 6 carbon atoms provided that at least two carbon atoms are arranged between the hydroxyl group and the oxygen atom, or a radical corresponding to the formula

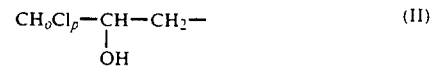

wherein o is 0, 1 or 2 and p is an integer from 1 to 3, provided that the sum of o+p=3.

The present invention also relates to the coated plastics thus obtained in accordance with this process.

Finally, the present invention relates to coating compositions containing a) 0.1 to 15% by weight, based on the weight of the binder, of a chemically modified, amorphous polyolefin having an average molecular weight of 10,000 to 100,000, a non-uniformity of 1.0 to 6.5, a chlorine content of 2.5 to 50% by weight and a total content of nitrogen, oxygen, sulfur and silicon, in the form of chemically incorporated functional groups, of about 2.5 to 15% by weight.

b) 2.5 to 35% by weight, based on the weight of component a), of a coupling-promoting compound corresponding to formula I.

DETAILED DESCRIPTION OF THE INVENTION

The coupling agents crucial to the invention are chemically modified, chlorine-containing, amorphous polyolefins, preferably chemically modified, amorphous polypropylenes, having an average molecular weight as ($M_w$, as determined by gel permeation chromatography) of 10,000 to 100,000, preferably 15,000 to 60,000 and more preferably 17,000 to 40,000; a non-uniformity ($U_n$) of 1.0 to 6.5, preferably 1.5 to 4.5; a content of chemically bound chlorine of 2.5 to 50% by weight, preferably 15 to 40% by weight and more preferably 20 to 35% by weight; and a total content of nitrogen, oxygen, sulfur and silicon, in the form of chemically incorporated functional groups, of 2.5 to 15% by weigbt, preferably 2.5 to 7.5% by weight. These functional groups are responsible for the excellent compatibility of the additives according to the invention with conventional coating compositions and for the high solubility in conventional coating solvents. In addition, these functional groups ensure firm physical fixing of the additive in the paint matrix.

Suitable functional groups include carboxyl, carboxylic anhydride, carboxylic acid ester, carboxylic acid amide, carboxylic acid imide, amino, aldehyde, ketone, sulfonic acid ester, hydroxy, hydroperoxide and alkoxysilane groups; heterocyclic groups such as imidazole, carbazole or pyridinyl groups; activated double bonds such as vinylsulfonyl or vinylamino groups; and mercapto groups. Preferred functional groups are hydroxyl, hydroperoxy (H—O—O—), carboxyl, carboxylic anhydride, carboxylic acid amide, carboxylic acid imide, carboxylic acid ester, amino and alkoxysilane groups, more preferably trimethoxy silane groups.

With regard to the suitability of these functional groups, they should not enter into any reactions either among themselves or with the components of the coating composition with which they are mixed under typical storage conditions, in the presence of atmospheric oxygen and moisture and/or at elevated temperatures of up to 120° C.

Amorphous polypropylenes having a molecular weight of 10,000 to 120,000 and a non-uniformity of 1.0 to 7.5 are preferably used as starting materials for the production of the chemically modified coupling agents. However, it is possible to use amorphous copolymers of polypropylene with up to 25% by weight, based on the total weight of all of the monomers, of other olefinically unsaturated monomers (such as ethylene, isoprene, 1,2-butadiene and/or 1,4-butadiene) and amorphous polyethylenes having molecular weights and non-uniformity factors in the ranges mentioned.

Chlorine is introduced in known manner by chlorination of the amorphous polyolefins used as starting material (cf Houben-Weyl, Methoden der organischen Chemie, Vol. V/3, pages 511–551, Georg Thieme Verlag, Stuttgart (1962)). To produce the additives according to the invention, chlorination is carried out at temperatures of about −10° C. to the boiling point of the particular solvent used.

The functional groups may be incorporated by reaction with conventional peroxides (incorporation of hydroperoxide or carboxyl groups) or by a radical-initiated grafting reaction with monomers bearing functional groups according to the invention. Suitable initiators for the grafting reaction are peroxides and azo compounds which are known for this purpose. The modification reactions are known per se and are described, for example, in the following literature references: G. A. Russel, J. Am. Chem. Soc., 79, 3871 (1957), M. Iring et al Polymer Degradation and Stability, 5, 467 (1983), N. G. Gaylord, Journal of Polymer Science, Polymer Letters Edition, Vol. 21, 23–30 (1983), A. Neyishe et al, J. of Appl. Poly. Sci. 22, 2953 (1978), A. Hoff, J. of Appl. Poly. Sci., 29, 465 (1984).

Suitable initiators include potassium peroxodi sulfate, azo-bis-isobutyronitrile, t-butyl perbenzoate, t-amyl perneodecanoate, p-benzodinene, t-butyl perisononanoate, di-2-ethyl hexylperoxydicarbonate or di-n-butyl peroxydicarbonate.

Suitable monomers bearing functional groups include allylamine; allyl alcohol; trimethoxyvinyl silane; triethoxyvinyl silane; ethyl allyl ether; 1-cyclohexene-4-dicarboxylic anhydride; maleic anhydride; maleic acid dimethyl, diethyl, dipropyl or dibutyl ester and acid amides thereof, such as maleic acid diethylamide, etc.; n-alkyl maleic acid imides such as n-propyl maleic acid imide or n-butyl maleic acid imide; fumaric acid; fumaric acid dimethyl, diethyl, dipropyl or dibutyl ester and acid imides or amides thereof; 3-trimethoxy silyl-1-chloropropane; N-[2-(trimethoxysilyl)-ethyl]-ethylenediamine; 3-trimethoxysilyl-1-chloropropane; mercaptoethyl, mercaptopropyl and mercaptobutyl trimethoxy or triethoxy silane; vinylene carbonate; vinylsulfone; 3-trimethoxysilylpropyl-1-imidazole; and carbazole. Suitable monomers are generally those which do not react with the polyolefins to form block copolymers.

Functional groups may be incorporated both in the melt by means of extruders or by other standard injection molding techniques at temperatures of about 140° C. to 300° C., but preferably at temperatures above the melting range of the particular polyolefins used (cf. G. M. Gale, Applied Organometallic Chemistry, 2, pages 17–31 (1988)) or in a suitable solvent (cf. DE-OS 1 546 982). To incorporate functional groups in solution, the grafting reaction is generally carried out at elevated temperatures of about 40° C. to the boiling point of the particular solvent. Suitable solvents include xylene, carbon tetrachloride, toluene, chlorobenzene, tetralin, cresol or mixtures of such solvents.

The order in which the reactions are carried out (chlorination and incorporation of the functional groups) is not critical.

In accordance with the present invention, certain bisphenol derivatives are used as further auxiliaries which are critical to the invention in addition to the above-mentioned coupling agents. The bisphenol derivatives in question are compounds corresponding to formula I.

Preferred bisphenol derivatives of this type are those in which the A is as already defined and $R_1$ and $R_2$ may be the same or different and represent radicals corresponding to the formula $$HO-(-CH_2)_n- \tag{III}$$

where n is an integer from 2 to 6.

Particularly preferred bisphenol derivatives are those corresponding to formula I wherein A is as already defined and $R_1$ and $R_2$ may be the same or different and represent radicals corresponding to formula II.

The bisphenol derivatives are prepared by known methods. The bisphenols may be also obtained by a known condensation reaction from phenol and the corresponding ketones or aldehyde, for example, acetone, acetaldehyde, cyclohexanone or isophorone, followed by incorporation of the substituents $R_1$ and $R_2$ by known substitution reactions at the two oxygen atoms of the bisphenols. The particularly preferred bisphenol derivatives bearing substituents $R_1$ and $R_2$ which correspond to formula II may be prepared by reaction of the particular bisphenols with epichlorohydrin to form the corresponding bisepoxide and subsequent opening of the oxirane ring with HCl. Compounds in which $o=2$ and $p=1$ can be obtained in this way. The more highly chlorinate bisphenol derivatives may be prepared by reaction of 3,3-dichloropropane-1,2-epoxide or 3,3,3-trichloro-propane-1,2-epoxide with the bisphenols in alkaline media and subsequent opening of the oxirane ring with HCl. The chlorinated epoxides are readily obtainable compounds which may be prepared from 3,3-dichloro-1-propene or 3,3,3-trichloro-1-propene by reaction with peroxobenzoic acid (cf for example H. Lee and K. Neville, Handbook of Epoxy Resins, Chapter 3, pages 6–8, McGraw-Hill Book Company, New York (1967)).

In accordance with the present invention, the bisphenol derivatives are used in quantities of 2.5 to 35% by weight, preferably 2.5 to 25% by weight, based on the weight of the chemically modified, amorphous polyolefin used as coupling agent. The mixture of a) chemically modified, amorphous polyolefins and b) bisphenol derivatives are preferably incorporated as coupling additives in solvent-containing coating compositions for plastics. Component a) represents the actual coupling additive, while component b) acts as a compatibility promoter for component a).

The mixture of components a) and b) are incorporated in the coating compositions in quantities which correspond to a quantity of component a) of 0.1 to 15% by weight, preferably 1 to 10% by weight and more preferably 2 to 5% by weight, based on the weight of the solvent-free binder.

The coating compositions used for coating the plastics include those containing one- or two-component polyurethanes, alkyd resins, melamine resins, saturated or unsaturated polyester resins, alkyd resins, nitrocellulose, rubbers or polyamide resins as binder. These coating compositions are preferably contain known solvents such as butyl acetate, methyl ethyl ketone, methyl isobutyl ketone, methoxypropyl acetate, toluene, xylene and mixtures of such solvents. However, it is also possible to use low-solvent or solventless coating compositions and also aqueous coating compositions in which the coupling agents crucial to the invention are present in the quantities mentioned above. Suitable coating compositions are described, for example, in H. Kittel, Lehrbuch der Lacke und Beschichtungen, Vol. IV, pages 76 to 306, Verlag W. A. Colomb (1986) or in the same "Lehrbuch", 1976 Edition, Vol. IV, pages 328 to 358.

In a preferred embodiment, the coating compositions are the known one-component and, more preferably, two-component polyurethanes systems.

Suitable one-component polyurethanes include those based on predominantly linear, fully reacted polyurethanes which are soluble in the previously mentioned organic paint solvents and which no longer contain any reactive groups, i.e., which dry physically (cf. for example Kunststoff-Handbuch, Vol. 7, "Polyurethane", edited by Gunter Oertel, Carl Hanser Verlag, München/Wien (1983) page 551). Suitable physically drying paints of this type include those in which the binders are based on a fully reacted linear polyurethane prepared from (i) a polyester diol, (ii) a chain extending agent and (iii) a diisocyanate. Suitable polyester diols (i) for the production of these polyurethanes include adipic acid/alkanediol polyester diols having a molecular weight of 600 to 3,000. The alkanediols oxydolide bitame-1,4-diol, hexane-1,6-diol, nepentyl glycol and mixtures of these glycols. Suitable chain-extending agents (ii) include the diols which are suitable for preparing the polyester diols and also diamines such as hexamethylenediamine and isophoronediamine. Suitable diisocyanates (iii) include 4,4'-diisocyanatodiphenyl methane and isophorone diisocyanate. The polyurethanes are prepared in known manner by reacting the starting materials at an equivalent ratio of isocyanate groups to isocyanate-reactive groups of approximately 0.9:1 to 1.1:1.

The particularly preferred two-component polyurethane coating compositions are those having a two-component polyurethane binder of the type described, for example, on pages 541 to 544 of the above-cited "Handbuch." The two-component binders of these compositions are based on a polyisocyanate component and a polyol component. The quantities of these components are selected to provide a NCO:OH equivalent ratio of 0.5:1 to 2:1, preferably 0.8:1 to 1.5:1. Suitable polyisocyanates are known and include biuret-, isocyanurate- or urethane-modified derivatives of monomeric diisocyanates such as 2,4-diisocyanatotoluene or mixtures thereof with 2,6-diisocyanatotoluene and, in particular, 1,6-diisocyanatohexane. These derivatives generally contain 10 to 25% by weight isocyanate groups.

Suitable polyols include, in particular, polyester polyols, polyether polyols and polyacrylate polyols.

The polyester polyols generally have a molecular weight of 500 to 5,000 ($M_n$) and contain at least 2, preferably 2 to 6 hydroxyl groups per molecule.

The polyether polyols generally have a molecular weight of 500 to 5,000 ($M_n$) and contain 2 to 3 hydroxyl groups per molecule.

The acrylate polyols have a molecular weight of 500 to 5,000 ($M_n$) and generally contain 1 to 12% by weight hydroxyl groups.

In addition, the coating compositions used may contain other auxiliaries and additives such as catalysts, pigments, the previously disclosed solvents, flow control agents, fillers, etc.

When they are used in two-component polyurethane coating compositions, the auxiliaries and additives and also the coupling agents according to the invention are generally incorporated in the polyol component.

The coating compounds containing the coupling agents a) and promotors b) according to the invention are especially suitable for coating various thermoplastics or thermosets. They are particularly suitable for coating polyolefins having a surface tension of at least 35 mN/m which, in many cases, cannot readily be coated due to adhesion problems. Polyolefins such as these include modified and unmodified, partly crystalline or amorphous polypropylenes and polyethylenes. Particularly preferred substrates for the coating compositions according to the invention are polypropylene moldings. In addition, polyvinylidene fluoride, polytetrafluoroethylene, ethylene/propylene/norbornadiene plastics, acrylonitrile/butadiene/styrene copolymers, polycarbonates, polyamide plastics, polyesters, polybutadienes, polysilicones and cellulose esters are also suitable substrates. The coating compositions according to the present invention are generally applied in a dry film thickness of 0.5 to 100 μm, preferably 20 to 50 μm, by any of the methods normally used for coating plastics. They are distinguished by their excellent stability to solvents.

In the case of multiple coatings, the base paint contains the additives according to the present invention, while in the additional layers the use of these additives is optional. However, improved inter-coat adhesion can be obtained when the additives are used. In such cases, the additives are added in the quantities disclosed above to the paint layers which do not come into direct contact with the plastic substrate.

The plastics coated in accordance with the invention may be used in various fields including the interior and exterior of automobiles, electrical and electronic equipment and various domestic appliances.

The invention is further illustrated but is not intended to be limited by the following examples in which all parts and percentages are by weight unless otherwise specified.

EXAMPLES

EXAMPLE 1

100 g amorphous polypropylene having an average molecular weight ($M_w$) of 60,000 were dissolved in 2,000 g carbon tetrachloride. 12 g trimethoxyvinyl silane and 1 g t-butyl perbenzoate were added dropwise to the resulting solution under nitrogen over a period of 1 hour at 70° C. The solution was then cooled to 10° C. and pure chlorine was introduced with continued UV irradiation until the further increase in weight amounted to 48 g. The polymer thus modified was then precipitated in 5,000 g ethanol, washed five times with pure ethanol and dried overnight. An additive having an average molecular weight of approximately 40,000 was obtained. It contained 5% by weight oxygen, 2.2% by weight silicon and 30% by weight chlorine. It was soluble in xylene, toluene and butyl acetate, and was distinguished by its excellent compatibility in coating compositions for plastics.

A commercially available modified polypropylene sheet (Hostalen PPN 8018, a product of Hoechst AG) measuring 100×100 mm was discharged and freed from dust particles by blasting with ionized air and then sprayed with a two-component polyurethane coating composition.

Component I of the coating composition was based on a mixture of 95 parts by weight of a hydroxyl-containing polyacrylate resin containing 2.8% by weight hydroxylgroups (∼Desmophen A 365, a product of Bayer AG, D-5090 Leverkusen), 20 parts by weight of a 25% by weight solution of the above-mentioned coupling agent in xylene, 5 parts by weight of a 25% by weight solution in xylene of a bisphenol derivative corresponding to the formula

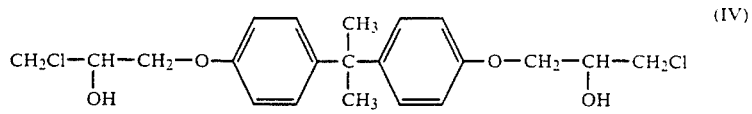

49.3 parts by weight talcum,
3.2 parts by weight black pigment (carbon black),
65.6 parts by weight titanium dioxide pigment (rutile),
4.8 parts by weight of a 10% solution in xylene of a commercially available antisettling agent (Bentone, a product of Kronos Titan GmbH, D-5090 Leverkusen) and
155 parts by weight of a solvent mixture of butyl acetate and xylene in a ratio by weight of 1:1.

Component II of the coating composition was based on a 75% solution in 1-methoxypropyl-2-acetate/xylene (1:1) of a biuret polyisocyanate based on 1,6-diisocyanatohexane (Desmodur N 75, a product of Bayer AG), NCO content of the solution 16.5% by weight. The quantity of components I and II corresponded to an NCO:OH equivalent ratio of 1:1.

After application, the paint was aired for 10 minutes and dried at 70° C.

A coating having a paint adhesion according to DIN 53 151 (cross-hatch adhesion test) of 0 was obtained.

COMPARISON EXAMPLE 1

When Example 1 was repeated without the additive combination crucial to the present invention (modified polypropylene and bisphenol derivative), the resulting coating had an adhesion value according to DIN 53 151 of 5. The coating was easy to remove from the surface.

EXAMPLE 2

A carbon black-filled, glass fiber-reinforced polypropylene sheet (Hoechst AG) measuring 100×100 mm was coated as in Example 1.

A coated sheet characterized by excellent paint adhesion was obtained. The coating had an adhesion value according to DIN 53 151 of 0 and easily passed both the condensed water test (DIN 50017-KK) and the alternating temperature test (ASTM D1211).

COMPARISON EXAMPLE 2

Example 2 was repeated without the combination crucial to the invention. The coating had an adhesion value of 5 and was easy to remove from the surface.

EXAMPLE 3

100 g amorphous polypropylene having an average molecular weight ($M_w$) of 100,000 were dissolved in 2,000 g carbon tetrachloride. 5 g azo-bis-isobutyronitrile in 100 ml carbon tetrachloride were then added dropwise to the solution over a period of 120 minutes at 75° C., followed by stirring for 3 hours at 75° C.

Chlorine gas was then introduced into the solution over a period of 60 minutes at 0° C. under UV irradiation until the increase in weight amounted to 21.8 g. The carbon tetrachloride was then replaced by pure xylene. A clear polymer solution was obtained. The solution had a solids content of 25% by weight. The modified polypropylene had an oxygen content of 3.5% by weight in the form of hydroxyl, hydroperoxy, carboxyl and chlorocarbonyl groups and, in addition, contained 17.5% by weight chemically bound chlorine.

A polypropylene sheet measuring 100×100 cm was coated with a two-component polyurethane paint in a dry film thickness of 15 μm by application under pressure.

Component I of the coating composition was based on a mixture of patibility and miscibility with known coating compositions.

A two-component polyurethane coating composition was prepared as in Example I of which component I with the exception that 28.0 parts by weight of a 25% solution in xylene of the above-described coupling agent and
6.0 parts by weight of a 25% solution in xylene of a bisphenol derivative corresponding to the formula

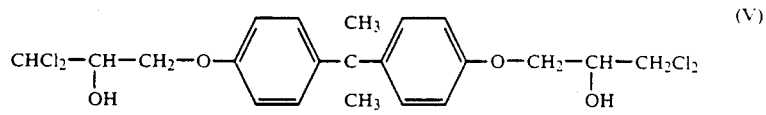

97.5 parts by weight of a polyester polyol containing 2.7% hydroxyl groups (~Desmophen A 565, a product of Bayer AG),
10 parts by weight of the solution of the coupling agent set forth in Example 1 additionally containing 7.5% by weight of the bisphenol derivative set forth in Example 1 as part of the combination,
50 parts by weight talcum,
3.7 parts by weight black pigment,
65.6 parts by weight titanium dioxide pigment (rutile) and
4.8 parts by weight of the solution of the antisettling agent set forth in Example 1.

Component II of the coating composition was based on a 40 parts by weight of the solution of the biuret polyisocyanate set forth in Example 1. The NCO:OH equivalent ratio was 1:1.

After airing and drying as described in Example 1, a coating having an adhesion value in the cross-hatch adhesion test of 0 was obtained.

Further investigation showed that the additive used did not adversely affect the properties of component I, even after storage for several months. The pot life of the coating composition also remained unchanged.

Component I was distinguished by its excellent stability in storage. Despite storage for several months, no separation of the solution was observed.

COMPARISON EXAMPLE 3

When Example 3 was repeated without the combination crucial to the invention, the resulting coating had a paint adhesion value in the cross-hatch adhesion test of 5.

EXAMPLE 4

100 g amorphous polypropylene having an average molecular weight of 40,000 was modified with N-[2-(trimethoxysilyl)-ethyl]-ethylenediamine in accordance with G. M. Gale, Applied Organometallic Chemistry, 2, 17 (1988). 3 g di-2-ethyl hexylperoxydicarbonate in 50 g carbon tetrachloride were then added to the modified polypropylene under nitrogen at 70° C., followed by chlorination under UV irradiation at 0° C. The modified polymer was precipitated in ethanol and dried under vacuum overnight at 80° C. An additive having an average molecular weight of 22,000 and a nitrogen content of 1.4% by weight, an oxygen content of 4.5% by weight, a silicon content of 1.4% by weight and a chlorine content of 24.8% by weight was obtained. It was soluble both in polar solvents, such as butyl acetate, and in apolar solvents and was distinguished by high comwere used instead of the coupling agent and bisphenol derivative used in Example 1. A coating was prepared in accordance with the process described in Example 1 (coating of polypropylene sheet). The coating had an adhesion value in cross hatch adhesion test of 0.

EXAMPLE 5

50 g amorphous polypropylene having an average molecular weight of 30,000 were dissolved in 1,000 g toluene. 7.5 g allylamine in 75 g toluene and 1.0 g t-amyl perneodecanoate in 50 g toluene were added dropwise to the solution under nitrogen over a period of 2 hours at 80° C. The solvent was then removed from the polymer under vacuum. The polymer was dissolved in 250 g carbon tetrachloride and chlorinated by UV irradiation at 0° C.

A modified additive containing 3% by weight nitrogen, 2% by weight oxygen and 18% by weight chlorine was obtained. It was readily soluble in coating compositions and solvents therefor.

A two-component polyurethane coating composition was prepared as in Example 1 with the exception that 2%, based on the weight of the polyacrylate polyol, of the coupling agent described above was used instead of the coupling used in Example 1. A coating was prepared in accordance with the process described in Example 1. The coating had an adhesion value of 0.

EXAMPLE 6

Amorphous polypropylene (250 g) having an average molecular weight of 90,000 was modified with maleic acid anhydride in accordance with the N. C. Gaylord, J. Polym. Sci., Polym Lett. Ed., 21, pages 23–30 (1983), dissolved in 5,000 g carbon tetrachloride and then chlorinated under nitrogen and UV irradiation and subsequently precipitated in ethanol. A polypropylene containing

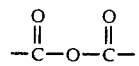

and CH$_2$—O—OH groups and having an oxygen content of 5.8% by weight, a chlorine content of 10% by weight and an average molecular weight of 40,000 was obtained.

A two-component polyurethane coating composition was prepared as in Example 1 with the exception that a 25% by weight solution in xylene of the coupling agent described above was used instead of the coupling agent used in Example 1. The resulting solution was distinguished by its stability in storage over a period of several months. A coating was prepared in accordance with the process described in Example 1. The coating had a paint adhesion value of 0.

EXAMPLE 7

Injection molded parts of polyethylene and polypropylene were coated with a coating composition containing 100 parts by weight of a 55% by weight solution in xylene of a commercially available linear polyurethane (Desmolac 4340, a product of Bayer AG), viscosity 7,500 mPa.s/23° C., 17.5 parts by weight of the 25% solution of the coupling agent described in Example 6, 2.5 parts by weight of the 25% solution of the bisphenol derivative described in Example 1, 12.4 parts by weight talcum, 8.4 parts by weight titanium dioxide pigment (rutile), 5.3 parts by weight of the antisettling agent described in Example 1 and 125 parts by weight of a solvent containing toluene, xylene and n-butyl acetate in a ratio by weight of 1:1:1.

The coatings had an adhesion value according to DIN 53 151 of 0 and showed excellent resistance condensed water (DIN50017-KK) and alternating temperatures (ASTM D1211).

COMPARISON EXAMPLE 4

When Example 7 was repeated without the additive combination crucial to the invention, the resulting coating had an adhesion value of 5.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which, comprises a one- or two-component binder and, in addition, a) 0.1 to 15.0% by weight, based on the weight of the binder, of at least one coupling agent based on a chemically modified, amorphous polyolefin having an average molecular weight of 10,000 to 100,000, a non-uniformity of 1.0 to 6.5, a chlorine content of 2.5 to 50% by weight and a total content of nitrogen, oxygen, sulfur and silicon, in the form of chemically incorporated functional groups, of about 2.5 to 15% by weight, and b) 2.5 to 35% by weight, based on the weight of the amorphous polyolefin, of a compound corresponding to the formula

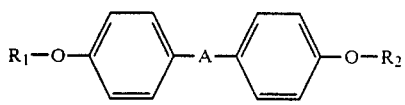

(I)

wherein

A is a difunctional radical corresponding to the following formulae

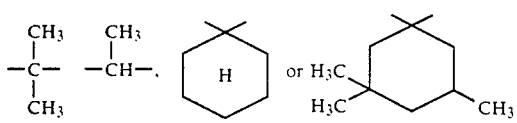

and

R₁ and R₂ may be the same or different and represent a saturated aliphatic hydrocarbon radical containing 1 to 8 carbon atoms, a hydroxyalkyl radical containing 2 to 6 carbon atoms provided that at least two carbon atoms are arranged between the hydroxyl group and the oxygen atom, or a radical corresponding to the formula

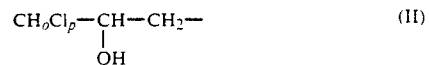

(II)

wherein $o$ is 0, 1 or 2 and $p$ is an integer from 1 to 3, provided that the sum of $o+p=3$.

2. The coating composition of claim 1 wherein said chemically modified, amorphous polyolefin comprises a chemically modified, amorphous polypropylene.

3. The coating composition of claim 1 wherein said binder comprises a two-component polyurethane.

4. The coating composition of claim 2 wherein said binder comprises a two-component polyurethane.

5. A process for coating a plastic substrate which comprises applying to said plastic substrate a coating composition which, comprises a one- or two-component binder and, in addition, a) 0.1 to 15.0% by weight, based on the weight of the binder, of at least one coupling agent based on a chemically modified, amorphous polyolefin having an average molecular weight of 10,000 to 100,000, a non-uniformity of 1.0 to 6.5, a chlorine content of 2.5 to 50% by weight and a total content of nitrogen, oxygen, sulfur and silicon, in the form of chemically incorporated functional groups, of about 2.5 to 15% by weight, and b) 2.5 to 35% by weight, based on the weight of the amorphous polyolefin, of a compound corresponding to the formula

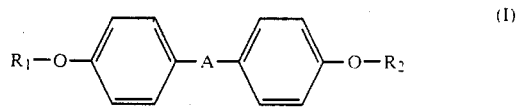

(I)

wherein

A is a difunctional radical corresponding to the following formulae

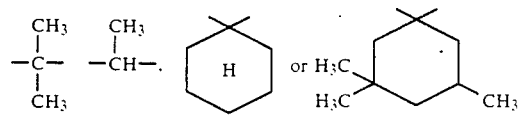

and

R₁ and R₂ may be the same or different and represent a saturated aliphatic hydrocarbon radical containing 1 to 8 carbon atoms, a hydroxylakyl radical containing 2 to 6 carbon atoms provided that at least two carbon atoms are arranged between the hydroxyl group and the oxygen atom, or a radical corresponding to the formula

(II)

wherein o is 0, 1 or 2 and p is an integer from 1 to 3, provided that the sum of $o+p=3$.

6. The process of claim 5 wherein said chemically modified, amorphous polyolefin comprises a chemically modified, amorphous polypropylene.

7. The process of claim 5 wherein said binder comprises a two-component polyurethane.

8. The process of claim 6 wherein said binder comprises a two-component polyurethane.

9. The process of claim 5 wherein said plastic substrate is amorphous or partly crystalline polypropylene or polyethylene.

10. The process of claim 6 wherein said plastic substrate is amorphous or partly crystalline polypropylene or polyethylene.

11. The process of claim 7 wherein said plastic substrate is amorphous or partly crystalline polypropylene or polyethylene.

12. The process of claim 8 wherein said plastic substrate is amorphous or partly crystalline polypropylene or polyethylene.

13. A coated plastic substrate which is prepared by a process which comprises applying to a plastic substrate a coating composition which, comprises a one- or two-component binder and, in addition, a) 0.1 to 15.0% by weight, based on the weight of the binder, of at least one coupling agent based on a chemically modified, amorphous polyolefin having an average molecular weight of ]0,000 to 100,000, a non-uniformity of 1.0 to 6.5, a chlorine content of 2.5 to 50% by weight and a total content of nitrogen, oxygen, sulfur and silicon, in the form of chemically incorporated functional groups, of about 2.5 to 15% by weight, and b) 2.5 to 35% by weight, based on the weight of the amorphous polyolefin, of a compound corresponding to the formula

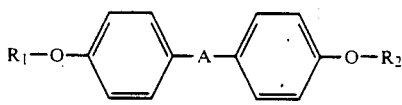   (I)

wherein

A is a difunctional radical corresponding to the following formulae

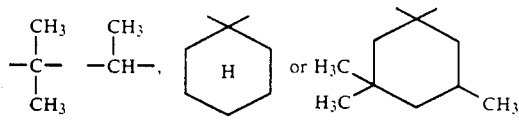

and $R_1$ and $R_2$ may be the same or different and represent a saturated aliphatic hydrocarbon radical containing 1 to 8 carbon atoms, a hydroxyalkyl radical containing 2 to 6 carbon atoms provided that at least two carbon atoms are arranged between the hydroxyl group and the oxygen atom, or a radical corresponding to the formula

   (II)

wherein o is 0, 1 or 2 and p is an integer from 1 to 3, provided that the sum of $o+p=3$.

14. The coated plastic substrate of claim 13 wherein said chemically modified, amorphous polyolefin comprises a chemically modified, amorphous polypropylene.

15. The coated plastic substrate of claim 13 wherein said binder comprises a two-component polyurethane.

16. The coated plastic substrate of claim 14 wherein said binder comprises a two-component polyurethane.

17. The coated plastic substrate of claim 13 wherein said plastic substrate is amorphous or partly crystalline polypropylene or polyethylene.

18. The coated plastic substrate of claim 14 wherein said plastic substrate is amorphous or partly crystalline polypropylene or polyethylene.

19. The coated plastic substrate of claim 15 wherein said plastic substrate is amorphous or partly crystalline polypropylene or polyethylene.

20. The coated plastic substrate of claim 16 wherein said plastic substrate is amorphous or partly crystalline polypropylene or polyethylene.

* * * * *